United States Patent [19]

Stayton

[11] Patent Number: 4,854,498
[45] Date of Patent: Aug. 8, 1989

[54] SHOWER TEMPERATURE CONTROL SYSTEM

[76] Inventor: L. Dean Stayton, 8520 W. 88th St., Overland Park, Kans. 66212

[21] Appl. No.: 203,881

[22] Filed: Jun. 8, 1988

[51] Int. Cl.$^4$ .......................................... G05D 23/185
[52] U.S. Cl. ................................. 236/12.12; 364/502
[58] Field of Search .......................... 236/12.12, 46 R; 165/12; 364/502

[56] References Cited

U.S. PATENT DOCUMENTS

| | | |
|---|---|---|
| 1,820,145 | 8/1931 | Liaset . |
| 1,996,330 | 4/1935 | Goshaw . |
| 2,430,133 | 11/1947 | Muffly . |
| 2,533,624 | 12/1950 | Ray . |
| 4,311,271 | 1/1982 | Nagui . |
| 4,420,811 | 12/1983 | Tarnay et al. . |
| 4,421,269 | 12/1983 | Ts'as . |
| 4,611,757 | 9/1986 | Saether . |
| 4,739,923 | 4/1988 | Tsutsui et al. ................. 364/502 X |

Primary Examiner—William E. Wayner
Attorney, Agent, or Firm—Litman, McMahon & Brown

[57] ABSTRACT

A shower temperature control system includes a single mixing valve connected between hot and cold sources of water and a shower head, a gear motor with a shaft connected to the mixing valve, a water temperature sensor positioned in the shower plumbing, a numeric keypad for numeric entry of desired shower water temperature, a potentiometer for alternate entry of desired shower temperature, and a controller which derives a motor drive signal from a difference between the sensed temperature and the set temperature. Initially, and when no temperature has been set, the controller maintains a safe default water temperature, such as 98° F. The controller incorporates memory for the storage of a plurality of preset shower water temperatures which may be selected by selection keys on the keypad.

19 Claims, 2 Drawing Sheets

SHOWER TEMPERATURE CONTROL SYSTEM

FIELD OF THE INVENTION

The present invention relates to water temperature regulation and, more particularly, to a water temperature control system for automatically regulating the temperature of water used in a household shower.

BACKGROUND OF THE INVENTION

Conventionally, the control of water temperature for household showers is accomplished by manually adjusting the flow rates of hot and cold water so that the mixture achieves the desired temperature. The water temperature may be adjusted by individual hot and cold valves or by a single valve mechanism which controls the overall flow rate of water exiting the shower head and, additionally, the proportions of hot and cold water. For example, the flow rate may be controlled by pulling and pushing the valve handle and rotating the handle clockwise and counterclockwise for temperature control.

When a shower has been idle for a considerable period of time, the water in the water pipes leading from the supply main and from the hot water tank becomes lukewarm. Under these conditions, it takes a fairly long time to establish a desired, steady temperature of the shower water as the lukewarm water is purged from the lines and steady state cold water from the supply main is mixed with steady state hot water from the hot water tank. It is often advisable to turn on the shower for a period of time before entering to avoid the "shock" of water which is too cold or, worse, the danger of scalding by water too hot.

Once a steady state, desired shower water temperature has been achieved, either with no other uses of the household water system occurring or with a steady rate usage occurring, the equilibrium of the system and, thus, the shower temperature can be upset by a change in water usage in the system. For example, the flushing of a toilet connected to the same cold water supply will reduce the cold water pressure available to the shower head, causing the shower water temperature to increase quickly. Similarly, a sudden hot water demand elsewhere in the local system, such as to wash dishes or take a shower in another bathroom, will reduce the available hot water pressure at the original shower with a resultant drop in shower water temperature.

There are a number of temperature regulation devices for liquids which have been developed, not only for shower water temperature control but also for other uses, such as for industrial processes, washing machines, and the like. The earlier types of devices included valves which were controlled more or less directly by mechanical temperature reactive devices. Several known devices employed bimetallic thermostat mechanisms positioned to sense output water temperature and connected by mechanical links and levers to valves controlling the flow of water from hot and cold sources. Others have exploited temperature related expansion and contraction of gases confined in bellows or cylinders with pistons to control the mixing valves. More modern liquid temperature regulation devices have employed electrical temperature sensors connected to amplifiers driving servomotors or connected to digital computers to control the mixing of hot and cold liquids.

Bimetal thermostatic strips generally incorporate joined strips of metals having different temperature-expansion characteristics such that at various temperatures, the strip bends more or less proportionately. Such strips are reasonably accurate over certain ranges and in certain environments as temperature indicating devices, for example, to rotate a needle with respect to a temperature calibration scale or to rotate an electrical contact. However, the accuracy of such a strip in directly controlling a water flow valve subject to substantial water pressure and varying flow rates, without intervening amplification of some sort, is questionable. Accuracy would likely be degraded further, over time, because of possible corrosion and scale incrustation in a hard water system.

Water temperature control devices have been proposed which control mixing valves by bellows or pistons in cylinders containing gases or vapors which exploit the temperature dependence of the pressure of the contained gas or vapor. Such devices are complex since it is necessary to calibrate the temperature variation in the gas pressure to the fluid pressure of the water sources. Since the available water pressure is not necessarily constant, water temperature errors are likely during pressure variations. Bellows or piston based water temperature controls are likely to be bulky in order to provide sufficient volume to generate the force needed to control the water pressure in the water system. Finally, such devices are likely to have slow reaction times and low sensitivity because of the necessity of equilibrating the water temperature to the gas containing structure and the gas itself.

Electronic control systems, both analog and digital, have been used to control shower water temperatures. In general, the electronic water temperature controllers are conventional feedback control systems wherein water temperature is sensed by a circuit element having a parameter, such as resistance, which varies with temperature. The sensed temperature is compared to a set temperature, and motors are activated to operate individual hot and cold water valves or a single mixing valve to decrease the temperature discrepancy. Electronic water temperature regulators, if properly designed, have a higher sensitivity, quicker response time, and greater accuracy than the thermostatic strip controllers and confined gas controllers described above.

SUMMARY OF THE INVENTION

The present invention is an improvement of water temperature controllers using electronic feedback circuitry. The system generally includes a hot and cold mixing valve connected between hot and cold water lines and a shower head and rotatable to vary the temperature of water exiting the shower head by varying the proportions of hot and cold water, a gear motor connected to the mixing valve to rotate it, a water temperature sensor positioned in the shower plumbing to sense the temperature of the shower water, and a water temperature set input connected to a shower temperature controller. A controller normally compares the temperature sensed by the water temperature sensor and the set temperature and controls the motor to move the mixing valve to minimize the discrepancy between the measured and set temperatures. Initially, the set temperature which is maintained is always a safe default temperature which will not cause injury to the occupant of the shower, such as 98° F. Once a desired temperature is actually set, the controller attempts to achieve and maintain the set temperature.

The system provides several modes of setting the water temperature to be maintained. The safe default temperature is set by a potentiometer which is, preferably, not accessible to the user. A keyboard is provided for operation by the user to numerically enter the desired temperature. Alternatively, the temperature may be set by an accessible potentiometer which simulates the operation of a single mixing valve type of shower control. Finally, temperatures which have been preset and stored numerically in a memory may be selected. A numeric display indicates the set temperature or the measured temperature, depending on the mode of operation.

In a first embodiment of the shower temperature control system, a microprocessor or microcontroller is the principal control element. Keypad operations are encoded and input on an input port of the processor. A voltage across the potentiometer resistance is converted to a binary code by an analog to digital converter and input to the processor. Selection logic circuitry is provided for selecting between keypad or potentiometer temperature setting. The microprocessor has read only memory (ROM) and read/write memory (RAM) connected thereto. The ROM stores the operating program while the RAM stores operating data. The RAM also stores codes representing preset shower temperatures which may be selected by the user. A numeric display is connected to an output port of the processor and displays the set temperature during temperature setting and, otherwise, displays the sensed water temperature measured by the water temperature sensor. Additionally, insufficient hot and cold water indicators are connected to the processor.

The position of a valve operator of the mixing valve is sensed and input to the processor. The temperature of the water mixture exiting the shower head is sensed, converted to a digital code by an analog to digital converter, and input to the computer. A digital motor control signal, based upon a difference between the set temperature and the sensed temperature as calculated by the processor, is converted to a voltage by a digital to analog converter, power amplified, and applied to the motor for rotation of the mixing valve in a direction to diminish the difference between the set and sensed temperatures. If no set temperature has been entered since the system was activated, the processor causes a safe default temperature, such as 98° F., to be maintained.

In a second embodiment of the shower temperature control system, the principal control element is an analog comparator having voltages representing the sensed water temperature and the set water temperature applied as inputs thereto. The comparator derives a difference voltage related to the difference between the voltages representing the temperatures, scales the difference voltage as necessary, and applies the scaled difference voltage through a power amplifier to the motor to cause the mixing valve operator to be rotated to a position to diminish the difference voltage to zero.

The second embodiment includes digital logic or a microprocessor to input the numerically entered set temperature, to generate codes for driving the numeric display, and for storing the preset temperatures. The numerically input set temperatures and stored preset temperatures are processed through an digital to analog converter to generate the set temperature voltage applied to the analog comparator. Selection logic circuitry is provided for selecting among the digital set temperatures, the default temperature, and a set temperature set by the potentiometer.

OBJECTS OF THE INVENTION

The principal objects of the present invention are: to provide an improved shower water temperature regulator system; to provide such a system which initially achieves and maintains a safe water temperature until another temperature is selected; to provide such a system wherein the temperature can be set either by numeric entry by a keypad or by use of a potentiometer; to provide such a system including a readout which displays a measured water temperature; to provide such a system including a memory which stores a plurality of desired water temperatures and keys on the keypad for selecting one of the stored temperatures; to provide such a system including a single rotary mixing valve rotated by a slow turing gear motor to mix cold and hot water to achieve a set temperature; to provide such a system including a microprocessor as the principal control element; to provide an embodiment of such a system including an analog comparator which derives a motor control signal from voltages proportional to a set water temperature and a measured temperature; to provide such a system constructed, as much as possible, from readily available components; to provide such a system which may be retrofitted to a great number of existing shower installations; and to provide such a system which is economical to manufacture, reliable in operation, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figures 1, 2:
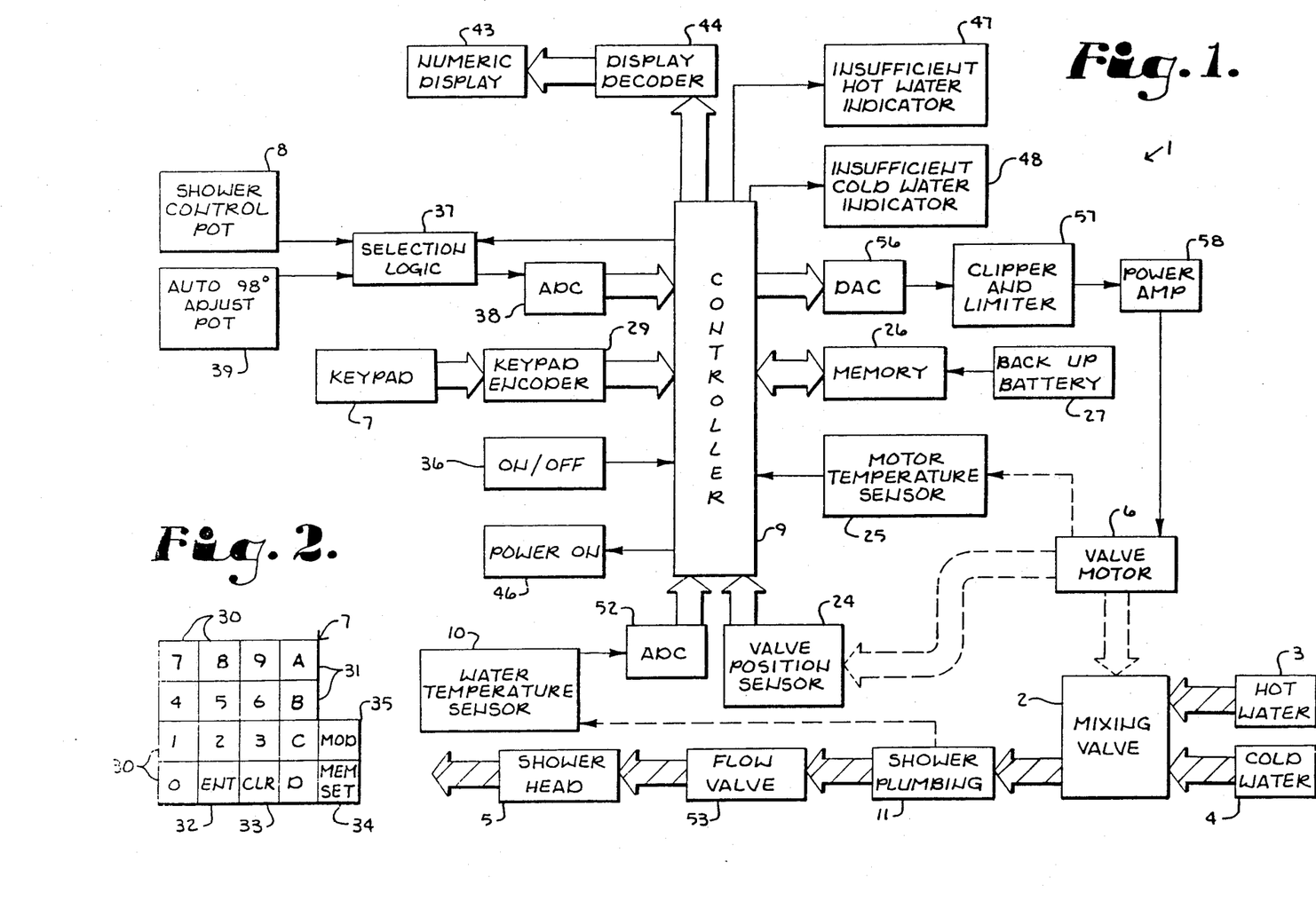
FIG. 1 is a block diagram illustrating the principal components of a shower temperature control system according to the present invention.
FIG. 2 is a diagrammatic view of a keypad for the input and selection of water temperatures in the system.

Referring to the drawings in more detail:

The reference numeral 1 generally designates a shower temperature control system embodying the present invention. The system 1 generally includes a rotary mixing valve 2 connected between hot and cold water sources 3 and 4 respectively and a shower head 5. A gear motor 6 has a shaft (not shown) which is connected to the valve 2 to effect a change in the proportions of hot and cold water exiting the shower head 5. Water temperature set means, including a keypad 7 and a potentiometer 8, are connected to a controller 9 and provides set temperature inputs thereto. A water temperature sensor 10 is connected between the shower plumbing, generally indicated at 11, and generates a signal related to the temperature sensed by the sensor 10. The controller 9 compares the actual water temperature sensed by the sensor 10 with the desired water temperature input by either the keypad 7 or the potentiometer 8 and generates a motor drive signal to cause the motor 6 to rotate the valve 2 to a position to diminish the difference between the actual or sensed water temperature and the desired or set temperature. When the system 1 is initially activated, the controller 9 causes the motor 6 to position the valve 2 to maintain a safe default water temperature, such as 98° F.

Figures 3, 4:
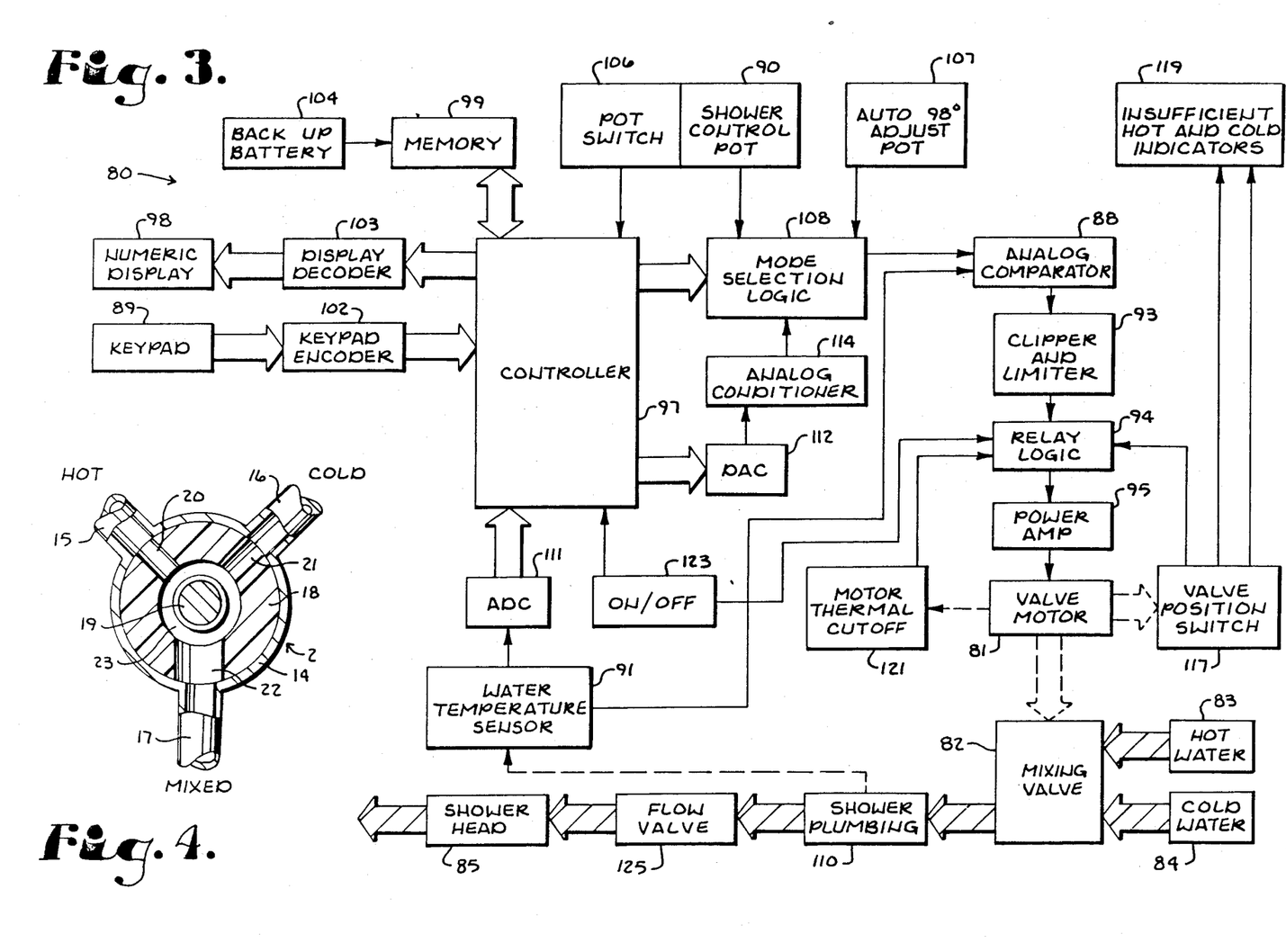
FIG. 3 is a block diagram illustrating a modified embodiment of the shower temperature control system employing an analog control feedback loop for temperature control.
FIG. 4 is a diagrammatic cross sectional view of an exemplary hot/cold mixing valve controlled by the shower temperature control system according to the present invention.

FIG. 4 diagrammatically illustrates a mixing valve 2 which is controlled by the system 1. The valve 2 includes a valve case 14 having a hot conduit 15, a cold conduit 16, and a combined or mixed conduit 17 communicating therewith. The hot and cold conduits 15 and 16 communicate respectively with the hot and cold water sources 3 and 4. Within the case 14, a valve body or operator 18 is positioned on a control shaft 19 rotatably supported by the case 14 and sealingly extending therefrom. The valve body 18 has a hot passage 20, a cold passage 21, and a mixed passage 22 formed therein and interconnected by a common passage 23. As the valve body 18 is rotated by the shaft 19, the positions of the hot and cold passages 20 and 21 with respect to the hot and cold conduits 15 and 16 are varied to thereby vary the proportions of hot and cold water flowing out the mixed conduit 17 through the mixed passage 22.

The illustrated valve 2 is exemplary, and other similar types of mixing valves may be employed in the system 1. A mixing valve which is known to be suitable for the system 1 is the model 1646-C, available from Delta Faucet Company of Greensburg, Ind. The valve 2 may incorporate means (not shown) to limit the angular excursion of the valve body 18. Additionally, the system 1 may be adapted such that upon shutdown of the system, the motor 6 is caused to rotate the valve body 18 to such a position that flow through the valve 2 is blocked before the system 1 actually powers down so that flow through the shower head 5 is only possible under the control of the system 1 when activated.

The gear motor 6 which controls the valve 2, or valve motor, has a motor shaft (not shown) which is geared down for very slow rotation and connected to the valve shaft 19 for turning same. A suitable motor 6 for the system 1 is model 4Z834, available from Dayton Electric Manufacturing Company of Chicago, Ill. This motor is reversible and has a full load rotation speed of 3.4 revolutions per minute and a torque of thirty inch-pounds. Its nominal power requirements are 12 volts D.C., positive or negative, and 0.6 amperes at full load.

A valve position sensor 24 is associated with the valve shaft 19 to determine its rotational position. The valve position sensor 24 may be a binary encoding device such that the precise position of the valve shaft 19 is communicated to the controller 9, particularly if the controller 9 relates the maintained temperature to a particular valve position. However, in the illustrated system 1, the controller 9 effects the maintenance of temperature by comparing the set temperature and the sensed temperature. Thus, in the system 1, only the extreme angular positions of the valve shaft 19 are needed, for determining whether sufficient hot or cold water to maintain a particular temperature is available, as will be detailed below. The valve motor 6 may incorporate a motor temperature sensor 25 connected to the controller 9. The controller 9 employs a motor temperature signal from the sensor 25 to cause shutdown of the system 1 in the event of the motor 6 overheating. The sensor 25 may incorporate a threshhold arrangement such that if the temperature of the motor 6 exceeds a selected level, a shutoff signal is sent to the controller 9.

The principal control element of the system 1 is the controller or processor 9 which may be a microprocessor or a one chip microcomputer, also known as a microcontroller. A number of suitable microcontrollers, having adequate throughput to control the system 1, are commercially available and would readily occur to one skilled in the appropriate art. The controller 9 includes internal read only memory (not shown) which is encoded with a program for controlling the system 1. The controller 1 includes read/write memory or RAM 26, which is preferably internal to the controller 1, to store temporary data, including codes representing preset shower temperatures. A back up battery is connected to the memory 26, or alternatively to the processor 9 itself, to preserve the preset codes during power down. The controller 9 preferably has a plurality of programmable input/out (I/O) ports which may be configured according to the operating program as input ports or output ports for communicating commands and/or data to external devices.

The keypad 7 is connected through a keypad encoder 29 to an input port of the controller 9. The encoder 29 generates binary codes which uniquely represent the operation of each of the various keys on the keypad 7. FIG. 2 diagrammatically illustrates an exemplary keypad 7, including numeric keys 0 through 9 (represented by reference numeral 30), memory select keys A through D (represented by reference numeral 31), an enter key (ENT) 32, a clear key (CLR) 33, and a memory set key (MEM SET) 34. The keypad 7 may also include a mode key (MOD) 35 which is operated to toggle the system 1 through various control modes in which the controller 9 respectively maintains the temperature set by the keypad 7, the potentiometer, or a default temperature mode. Alternatively, other means may be provided for selecting the control mode. An on/off switch 36, which may be positioned on the keypad 7, is connected to the controller 9 and is operable to activate or deactivate the system 1.

The shower control potentiometer 8 is connected through selection logic circuitry 37 and an analog to digital converter (ADC) 38 to an input port of the controller 9. Additionally, a second potentiometer 39 is connected to the selection logic 37. The potentiometer 39 is employed for inputting a resistance representing a default temperature, such as 98° F., and is preferably not accessible to the user of the system 1. The selection logic 37 receives a control signal from the controller 9 according to the mode set by the key 35 to select one of the potentiometers 8 or 39 or to ignore both if a numeric temperature is to be set from the numeric keys 30 of the keypad 7. When one of the potentiometers 8 or 30 has been selected, a voltage across the resistance of the selected potentiometer is applied to the ADC 38, which converts the voltage to a corresponding binary code readable by the controller 9.

A numeric display 43 is connected by a display decoder 44 to an output port of the controller 9. The decoder 44 receives binary codes from the controller 9 and routes codes representing numbers or other characters to be displayed to the proper segments of the digits of the display 43. The display 43 shows the temperature by the numeric keys 30 or potentiometer during temperature setting. Thereafter, the temperature sensed by the water temperature sensor 10 is displayed. The display 43 may be a plurality of seven segment light emitting displays (LED's), in which case the decoder incorporates the required driving amplifiers. Alternatively, the display 43 may be a liquid crystal display (LCD), a fluorescent display, or other type of display technology. The decoder 44 may also incorporate data latches for maintaining a currently displayed temperature until updated. The system 1 is provided with other indicators, such as a power/on indicator 46, an insufficient hot water indicator 47, an insufficient cold water indicator 48 which are preferably individual LED's with drivers.

The water temperature sensor 10 may be a thermistor, thermocouple, or other type of passive electrical device having a parameter, such as resistance, which varies with temperature. Alternatively, the sensor 10 may be an active device wherein an output value such as voltage is temperature dependent. The preferred water temperature sensor 10 is an integrated circuit, such as an LM335, with a temperature dependent output voltage. The output from the sensor 10 is applied to an analog to digital converter 52 for generation of a binary code corresponding to the voltage derived from the sensor 10. The code from the ADC 52 is read by the controller 9 and scaled to a sensed water temperature. Alternatively, the water temperature sensor 10 may be connected through the selection logic 37 and the output from the sensor 10 converted by the ADC 38. In such an arrangement, the controller 9 would be programmed to periodically cause the logic circuitry 37 to connect the sensor 10 to the ADC 38 for a sensed temperature reading. The sensor 10 is placed in the shower plumbing 11 at some position between the mixing valve 2 and the shower head 5. A shower flow rate valve 53 may also be positioned in the plumbing for manual control of the shower flow rate.

The controller 9 controls the motor 6 to vary the proportions of hot and cold water from the hot and cold sources 3 and 4 by comparing numbers representing the set temperature and the sensed temperature and generates a code representing a motor control voltage related to the difference between the set and sensed temperatures. The voltage is applied to the motor 6 to cause it to rotate the mixing valve 2 in such a direction as to diminish the temperature discrepancy. The motor control code is applied to a digital to analog converter 56 which converts the input binary code to a corresponding analog motor control voltage. The illustrated motor 6 has a voltage "dead band" of approximately 3 volts, positive and negative. Applied voltages within this range are ineffective to cause rotation of the motor 6. Additionally, it is desirable to limit the applied voltage to a selected range outside the dead band. For these reasons, the output of the DAC 56 is applied to a clipper and limiter circuit 57 so that only voltages from the DAC 56 which fall outside of the dead band but within the limits of the selected operating voltage range are applied to the motor 6. The circuit 57 might not be required with all possible motors which are suitable for use in the system 1. The output from the circuit 57 is power amplified by a power amplifier 58 to provide the required current for driving the motor 6.

In operation, the flow valve 53 is opened and the on/off switch 36 is operated to activate the system 1. Initially, before a desired temperature has been entered, the controller 9 commands the selection logic 37 to select the 98° potentiometer 39 to cause the maintenance of the safe default temperature. If the shower water system has been inactive for a period of time, hot water from the hot water source 4 will not be available until the hot water line has been purged of lukewarm or cold water. The water temperature sensor 10 will signal the measured temperature to the controller 9. For this reason, the controller 9 will cause the motor 6 to rotate the valve body 18 to an extreme hot position. This activates the valve position sensor 24 which causes the controller 9 to illuminate the insufficient hot water indicator 47 to indicate that the "set" or default temperature cannot be currently be achieved or maintained. After the hot water line has been purged and hot water becomes available, the controller 9 will cause the motor 6 to move toward the cold direction until a steady state 98° F. is achieved. If the water standing in the water lines were initially hot during summer, because of passage of the lines through an uninsulated attic, for example, an opposite train of events would occur with the insufficient cold indicator 48 being illuminated until the set or default temperature could be achieved.

The desired shower temperature may be set by using the shower control potentiometer 8, the numeric keys 30, or the memory select keys 31, if a temperature has been previously entered into memory 26. The mode key 35 is used to select the control mode which may be indicated by indicators (not shown) provided on the numeric display 43. The system 1 may be programmed so that when the potentiometer 8 is selected, the controller 9 immediately attempts to achieve and maintain a temperature corresponding to the angular position of the potentiometer 8. One problem with such a mode of operation is that if the potentiometer 8 is at one of its extremes, the controller 9 will immediately attempt to achieve a corresponding temperature. Therefore, it is preferable that when the potentiometer 8 is selected, the display 43 is caused to read a temperature corresponding to the angular position of the potentiometer 8 for consideration by the user first. The user may then readjust the potentiometer 8 and, upon operation of the enter key 32, cause the controller 9 to maintain the selected temperature.

If a numeric mode of entry is desired, the mode key 35 is used to select numeric entry mode and the desired temperature is entered by operation of the numeric keys 30. If a mistake is made, or another temperature is subsequently desired, the clear key 33 may be operated and another temperature entered. Thereafter, when the enter key 32 is operated, the controller 9 causes the system 1 to achieve and maintain the set temperature. The controller 9 is preferably programmed such that if a temperature exceeding a selected temperature is entered, it is neglected and an error condition, such as "EEE " is displayed or flashed on the display 43. This would prevent a user from entering a possibly injurious temperature. The system 1 may also be provided with a sounding device (not shown) to audibly alert the user to erroneous entries.

A number of preset shower temperatures, four in the embodiment illustrated, may be stored in the memory 26 for selection by the memory select keys 31. For this, the mode key 35 is used to select the memory mode, a preset temperature is entered by the numeric keys 30, one of the memory select keys 31 is operated, then the memory set key 34 is operated to cause storage of the entered temperature. Whatever temperature was previously associated with the particular memory select key 31 is overwritten and the new temperature stored. When it is desired to select a preset temperature, the mode key 35 is operated to select the memory mode, the memory select key 31 corresponding to the desired temperature is operated, and the enter key 32 is operated to cause the controller 9 to maintain the temperature corresponding the stored temperature. When the memory select key 31 is operated, the temperature associated with it is displayed on the numeric display 43. When the enter key 32 is operated, the numeric display 43 shows the temperature sensed by the water temperature sensor 10. The system 1 may be programmed such that preset temperatures can also be entered using the shower control potentiometer 8. The system 1 operates in a dynamic manner in that it continuously makes corrections, as necessary, to maintain the set temperature. If the equilibrium of the water system is upset by a sudden demand for hot or cold water elsewhere in the water system, the system 1 operates to quickly adjust the valve 2 to maintain the set temperature or alerts the bather of the inability to do so.

The keypad 7 is preferably combined with the numeric display 43, the on/off switch 36, the indicators 46, 47, and 48, and the shower control potentiometer 8 into a single unit having the dimensions of a standard sized tile of the type commonly used in shower installations. This will allow the "user interface" to be neatly integrated into a new or existing shower or bath installation. The displays, keys, and potentiometer are well insulated to prevent shock hazards and deterioration of the components from the entry of water or moisture. Preferably, the system 1 also incorporates ground fault protection circuitry (not shown) for further protection against shock hazards.

FIG. 3 illustrates a second embodiment of the shower temperature control system according to the present invention. The modified system 80 achieves the same objectives as the system 1. However, the manner of controlling a valve motor 81 to rotate a mixing valve 82 to vary the proportions of hot and cold water from hot and cold water sources 83 and 84 to control the temperature of water exiting a shower head 85 is somewhat different from that in the system 1. The principal control element in the system 80 is an analog comparator 88 to which are input voltages proportional respectively to a set temperature input from a keypad 89 or a shower control potentiometer 90 and a temperature measured by a water temperature sensor 91. The comparator 88 outputs a voltage difference signal which is processed by a clipper and limiter circuit 93, operating in the same fashion as the circuit 57 of the system 1. The signal which outputs from the circuit 93 is passed through relay logic circuitry 94 and a power amplifier 95 to the motor 81 for control thereof.

The system 80 employs a microprocessor or microcontroller 97 for handling the functional codes entered by the keypad 89, for outputting codes to a numeric display 98, for storing codes representing preset temperatures in a memory 99, and for outputting codes representing temperatures entered by the keypad 89 or selected from the memory 99. Alternatively, the functions performed by the controller 97 may be performed by a combination of discrete digital logic circuits.

The keypad 89 is substantially similar to the keypad 7 and is connected through a keypad encoder 102 to the controller 97. The numeric display 98 is connected by a display decoder 103 to the controller 97. The memory 99 is read/write memory and preferably includes a back up battery 104 for preserving data during a power down condition of the system 80. The controller 97 is provided internally with read only memory (not shown) which stores an operating program for the system 80. The shower control potentiometer 90 incorporates a switch 106 which functions as a mode selection switch in the system 80. A second potentiometer 107 is provided for controlling the default temperature maintained by the system 80. The potentiometers 90 and 107 are connected through mode selection logic circuitry 108 to the comparator 88. The selection logic circuitry 108 is controlled by the controller 97 to determine which of the keypad 89 or the potentiometers 90 or 108 are used to set the maintained temperature.

The voltage generated by the water temperature sensor 91, as measured from the shower plumbing 110, is applied directly to the comparator 88 and indirectly through an analog to digital converter 111 to the controller 97. The connection of the sensor 91 to the controller 97 is for the purpose of displaying the sensed temperature via the numeric display 98. Digital codes representing temperatures entered by the keypad 89 or selected from the memory 99 are converted to analog voltages by a digital to analog converter 112 and conditioned or scaled by an analog conditioner amplifier 114. The output of the amplifier 114 is applied to the comparator 88.

The hot and cold extremes of angular position of a shaft (not shown) of the mixing valve 82 are sensed by a valve position switch 117, which may incorporate several switch devices. The switch 117 is connected to the relay logic 94 and to insufficient hot and cold indicators 119. A motor thermal cutoff circuit 121 is connected to the relay logic 94 and senses excessive temperature of the motor 81 and causes incapacitation of the motor 81, or alternatively of the entire system 80. An on/off switch 123 is connected to the relay logic 94 and to the controller 97. The relay logic 94 is a combination of relays which enable or inhibit the passage of the motor control signal from the clipper/limiter circuit 93 to the power amplifier 95 according to the conditions sensed by the on/off switch 123, the valve position switch 117, and the motor thermal cutoff circuit 121. The extremes of rotation of the valve 82 cause shutdown of the motor 81 to prevent overtravel of the valve 82 during normal operation. Overtravel, for example in the cold direction, may be allowed at shutdown to block the flow of water through the valve 82. Alternatively, the system 82 may be provided with a manual flow regulating valve 125 connected in the shower plumbing 110 between the mixing valve 82 and the shower head 85. The relay logic 94 may alternatively be implemented as solid state equivalents of electromechanical relays.

Operation of the system 80 is very similar to operation of the system 1, as far as the bather is concerned.

The principal difference is that in the system 80, the potentiometer switch 106 and an enter key (not detailed) on the keypad 89 perform similar functions to that of the mode selection switch 35 of the system 1. When the system 80 is initially powered up before an operation mode or temperature has been selected, the controller 97 causes the maintenance of a safe default temperature, such as 98° F. Thereafter, if a numeric temperature is entered on the keypad 89 or a stored preset temperature is selected from the memory 99 and an enter key operated, the controller 97 outputs a code representing the selected temperature for conversion to a set temperature voltage. Otherwise, if the potentiometer switch 106 is operated, a voltage across the potentiometer 90 is applied ultimately to the comparator 88 for comparison with the sensed temperature voltage from the water temperature sensor 91. During operation, the numeric display 98 reads out the sensed temperature.

The controller 97 is capable of ignoring temperatures entered via the keypad 89 which exceed a selected maximum temperature to avoid a possibly injurious temperature and providing an alert in such an event. However, since the shower control potentiometer 90 is not connected through the controller 97, care must be exercised in use of the initial setting of the potentiometer 90.

It is to be understood that while certain forms of the present invention have been illustrated and described herein, it is not to be limited to the specific forms or arrangement of parts described and shown.

What is claimed and desired to be secured by Letters Patent is as follows:

1. A shower water temperature control system for use with hot and cold water sources to control the temperature of water exiting a shower head comprising:
   (a) hot/cold mixing valve means connected between hot and cold water sources and a shower head, said mixing valve including a mixing valve operator positionable to control the proportions of hot and cold water transferred from said hot and cold water sources to said shower head to thereby vary the temperature of water existing therefrom;
   (b) motor means drivingly connected to said mixing valve operator and operable to position same;
   (c) water temperature sensor means positioned to sense the temperature of water exiting said shower head;
   (d) water temperature set means operable to set a desired shower water temperature;
   (e) shower temperature control means having said motor means, said sensor, and said set means interconnected therewith, said control means initially controlling said motor means to position said mixing valve to cause the maintenance of a selected safe default temperature;
   (f) upon the operation of said temperature set means, said control means comparing a sensed temperature sensed by said sensor means with a set temperature set by said set means and controlling said motor means to position said mixing valve means such that said sensed temperature equals said set temperature;
   (g) said water temperature set means including:
      (1) a numeric keypad having numeric keys thereon; and
      (2) a keypad encoder connecting said keypad to said shower temperature control means, generating numerically coded key signals upon the operation of said numeric keys, and applying said key signals to said control means which are interpreted by said control means as the setting of said set temperature;
   (h) said control means including memory means to store a plurality of numeric values respectively representing stored set temperatures;
   (i) said keypad including a memory set key which, upon being operated, causes a set temperature entered by operation of said numeric keys to be stored in said memory means; and
   (j) said keypad including a plurality of memory selection keys corresponding to said stored set temperatures, the operation of one of said memory selection keys causing said control means to maintain a set temperature equal to a stored set temperature corresponding to said one of said memory selection keys.

2. A system as set forth in claim 1 including:
   (a) a numeric display connected to said shower temperature control means and operative to indicate one of a set temperature and a sensed temperature.

3. A system as set forth in claim 1 wherein said keypad includes:
   (a) an enter key which, upon being operated, causes said control means to maintain a set temperature previously entered by operation of said numeric keys.

4. A system as set forth in claim 1 wherein:
   (a) said control means includes a programmed digital computer.

5. A system as set forth in claim 1 including:
   (a) a numeric display connected to said shower temperature control means and operative to indicate one of a set temperature and a sensed temperature; and
   (b) said keypad including an enter key which, upon being operated, causes said control means to maintain a set temperature previously entered by operation of said numerical keys.

6. A shower water temperature control system for use with hot and cold water sources to control the temperature of water exiting a shower head comprising:
   (a) hot/cold mixing valve means connected between hot and cold water sources and a shower head, said mixing valve including a mixing valve operator positionable to control the proportions of hot and cold water transferred from said hot and cold water sources to said shower head to thereby vary the temperature of water existing therefrom;
   (b) motor means drivingly connected to said mixing valve operator and operable to position same;
   (c) water temperature sensor means positioned to sense the temperature of water exiting said shower head;
   (d) water temperature set means operable to set a desired shower water temperature;
   (e) shower temperature control means having said motor means, said sensor, and said set means interconnected therewith, said control means initially controlling said motor means to position said mixing valve to cause the maintenance of a selected safe default temperature;
   (f) upon the operation of said temperature set means, said control means comparing a sensed temperature sensed by said sensor means with a set temperature set by said set means and controlling said motor means to position said mixing valve means such that said sensed temperature equals said set temperature; and (g) said water temperature set means including a potentiometer capable of a range of resistances and connected to said control means, said control means maintaining a range of shower water temperatures proportional to said range of resistances.

7. A system as set forth in claim 1 wherein said water temperature set means includes:
(a) a numeric keypad having numeric keys thereon; and
(b) a keypad encoder connecting said keypad to said shower temperature control means, generating numerically coded key signals upon the operation said numeric keys, and applying said key signals to said control means which are interpreted by said control means as the setting of said set temperature.

8. A system as set forth in claim 6 wherein said control means is a digital computer means and including:
(a) an analog to digital converter connecting said potentiometer to said control means and converting a resistance of said potentiometer to a binary word having a value corresponding to the potentiometer resistance.

9. A system as set forth in claim 6 wherein:
(a) said control means includes an analog comparator having said water temperature sensor means and said water temperature set means operatively connected thereto;
(b) said analog comparator is operatively connected to said motor means; and
(c) said analog comparator is operative to generate a motor drive signal related to a difference between said set temperature and said sensed temperature.

10. A system as set forth in claim 6 including:
(a) a numeric display connected to said shower temperature control means and operative to indicate one of a set temperature and a sensed temperature.

11. A system as set forth in claim 10 wherein said control means is a digital computer means and including:
(a) an analog to digital converter said potentiometer to said control means and converting a resistance of said potentiometer to a binary word having a value corresponding to the potentiometer resistance.

12. A shower water temperature control system for use with hot and cold water sources to control the temperature of water exiting a shower head comprising
(a) hot/cold mixing valve means connected between hot and cold water sources and a shower head, said mixing valve including a mixing valve operator positionable to control the proportions of hot and cold water transferred from said hot and cold water sources to said shower head to thereby vary the temperature of water exiting therefrom;
(b) motor means drivingly connected to said mixing valve operator and operable to position same;
(c) water temperature sensor means positioned to sense the temperature of water exiting said shower head;
(d) water temperature set means operable to set a desired shower water temperature;
(e) shower temperature control means having said motor means, said sensor, and said set means interconnected therewith, said control means initially controlling said motor means to position said mixing valve to cause the maintenance of a selected safe default temperature;
(f) upon the operation of said temperature set means, said control means comparing a sensed temperature sensed by said sensor means with a set temperature set by said set means and controlling said motor means to position said mixing valve means such that said sensed temperature equals said set temperature;
(g) a numeric display connected to said shower temperature control means and operative to indicate one of a set temperature and a sensed temperature;
(h) said water temperature set means including:
(1) a numeric keypad having numeric keys thereon;
(2) a keypad encoder connecting said keypad to said shower temperature control means, generating numerically coded key signals upon the operation of said numeric keys, and applying said key signals to said control means which are interpreted by said control means as the setting of said set temperature;
(3) a potentiometer capable of a range of resistances and connected to said control means, said control means maintaining a range of shower water temperatures proportional to said range of resistances; and
(4) a potentiometer switch connected to said control means and, upon operation, causing said control means to receive a set temperature from said potentiometer; and
(i) an enter key which, upon being operated, causes said control means to maintain a set temperature previously entered by operation of one of said water temperature set means 13. A system as set forth in claim 12 wherein:
(a) said control means includes memory means to store a plurality of numeric values respectively representing stored set temperatures;
(b) said keypad includes a memory set key which, upon being operated, causes a set temperature entered by operation of said numeric keys to be stored in said memory means; and
(c) said keypad includes a plurality of memory selection keys corresponding to said stored set temperatures, the operation of one of said memory selection keys causing said control means to maintain a set temperature equal to a stored set temperature corresponding to said one of said memory selection keys.

14. A system as set forth in claim 12 wherein said control means is a digital computer means and including:
(a) an analog to digital converter connecting said potentiometer to said control means and converting a resistance of said potentiometer to a binary word having a value corresponding to the potentiometer resistance.

15. A system as set forth in claim 12 including
(a) valve operator position sensor means positioned to sense at least opposite extreme positions of said mixing valve operator, said extreme positions corresponding respectively to positions wherein only water from said hot water source and only water from said cold water source flows from said shower head; and
(b) an insufficient hot water indicator and an insufficient cold water indicator operatively connected to said position sensor means, the insufficient hot and cold water indicators being activated upon said position sensor means sensing said valve operator being a corresponding one of said extreme positions.

16. A system as set forth in claim 12 wherein:
   (a) said control means includes an analog comparator having said water temperature sensor means and said water temperature set means operatively connected thereto;
   (b) said analog comparator is operatively connected to said motor means; and
   (c) said analog comparator is operative to generate a motor drive signal related to a difference between said set temperature and said sensed temperature.

17. A shower water temperature control system for use with hot and cold water sources to control the temperature of water exiting a shower head comprising:
   (a) hot/cold mixing valve means connected between hot and cold water sources and a shower head, said mixing valve including a mixing valve operator positionable to control the proportions of hot and cold water transferred from said hot and cold water sources to said shower head to thereby vary the temperature of water existing therefrom;
   (b) motor means drivingly connected to said mixing valve operator and operable to position same;
   (c) water temperature sensor means positioned to sense the temperature of water exiting said shower head;
   (d) water temperature set means operable to set a desired shower water temperature;
   (e) shower temperature control means having said motor means, said sensor, and said set means interconnected therewith, said control means initially controlling said motor means to position said mixing valve to cause the maintenance of a selected safe default temperature;
   (f) upon the operation of said temperature set means, said control means comparing a sensed temperature sensed by said sensor means with a set temperature set by said set means and controlling said monitor means to position said mixing valve means such that said sensed temperature equals said set temperature;
   (g) valve operator position sensor means position to sense at least opposite extreme positions of said mixing valve operator, said extreme positions corresponding respectively to positions wherein only water from said hot water source and only water from said cold water source flows from said shower head; and
   (h) an insufficient hot water indicator and an insufficient cold water indicator operatively connected to said position sensor means, the insufficient hot and cold water indicators being activated upon said position sensor means sensing said valve operator being a corresponding one of said extreme positions.

18. A system as set forth in claim 17 including:
   (a) a numeric display connected to said shower temperature control means and operative to indicate one of a set temperature and a sensed temperature.

19. A shower water temperature control system for use with hot and cold water sources to control the temperature of water exiting a shower head comprising:
   (a) hot/cold mixing valve means connected between hot and cold water sources and a shower head, said mixing valve including a mixing valve operator positionable to control the proportions of hot and cold water transferred from said hot and cold water sources to said shower head to thereby vary the temperature of water existing therefrom;
   (b) motor means drivingly connected to said mixing valve operator and operable to position same;
   (c) water temperature sensor means positioned to sense the temperature of water exiting said shower head;
   (d) water temperature set means operable to set a desired shower water temperature;
   (e) shower temperature control means having said motor means, said sensor, and said set means interconnected therewith, said control means initially controlling said motor means to position said mixing valve to cause the maintenance of a selected safe default temperature;
   (f) upon the operation of said temperature set means, said control means comparing a sensed temperature sensed by said sensor means with a set temperature set by said set means and controlling said motor means to position said mixing valve means such that said sensed temperature equals said set temperature;
   (g) a numeric display connected to said shower temperature control means and operative to indicate one of a set temperature and a sensed temperature;
   (h) valve operator position sensor means connected to said control means and positioned to sense at least opposite extreme positions of said mixing valve operator, said extreme positions corresponding respectively to positions wherein only water from said hot water source and only water from said cold water source flows from said shower head;
   (i) an insufficient hot water indicator and an insufficient cold water indicator connected to said control means; and
   (j) said control means responding to said position sensor means indicating one of said extreme positions by activating a corresponding one of the insufficient hot and cold indicators.

* * * * *